(12) United States Patent
Horie et al.

(10) Patent No.: US 9,966,599 B2
(45) Date of Patent: May 8, 2018

(54) PROCESS FOR MANUFACTURING LITHIUM TITANIUM OXIDES

(71) Applicant: Ishihara Sangyo Kaisha, Ltd., Osaka (JP)

(72) Inventors: Hiroomi Horie, Yokkaichi (JP); Naoya Nagahashi, Yokkaichi (JP); Tsunehisa Takeuchi, Yokkaichi (JP)

(73) Assignee: ISHIHARA SANGYO KAISHA, LTD., Osaka (JP)

( * ) Notice: Subject to any disclaimer, the term of this patent is extended or adjusted under 35 U.S.C. 154(b) by 175 days.

(21) Appl. No.: 14/895,202

(22) PCT Filed: May 30, 2014

(86) PCT No.: PCT/JP2014/064398
§ 371 (c)(1),
(2) Date: Dec. 1, 2015

(87) PCT Pub. No.: WO2014/196462
PCT Pub. Date: Dec. 11, 2014

(65) Prior Publication Data
US 2016/0118657 A1 Apr. 28, 2016

(30) Foreign Application Priority Data
Jun. 4, 2013 (JP) ................. 2013-117992

(51) Int. Cl.
*H01M 4/00* (2006.01)
*H01M 4/485* (2010.01)
*C01G 23/00* (2006.01)
*H01M 4/04* (2006.01)
*H01M 4/1391* (2010.01)
*C01G 23/04* (2006.01)

(52) U.S. Cl.
CPC .......... *H01M 4/485* (2013.01); *C01G 23/005* (2013.01); *C01G 23/04* (2013.01); *H01M 4/0404* (2013.01); *H01M 4/1391* (2013.01); *C01P 2002/72* (2013.01); *C01P 2004/51* (2013.01); *C01P 2004/61* (2013.01); *C01P 2004/62* (2013.01); *C01P 2006/11* (2013.01); *C01P 2006/12* (2013.01); *C01P 2006/19* (2013.01); *C01P 2006/40* (2013.01); *C01P 2006/80* (2013.01)

(58) Field of Classification Search
CPC ... C01G 23/04; C01G 23/005; C01P 2002/72; C01P 2004/51; C01P 2004/61; C01P 2004/62; C01P 2006/11; C01P 2006/12; H01M 4/485; H01M 4/1391; H01M 4/04
See application file for complete search history.

(56) References Cited

U.S. PATENT DOCUMENTS

| | | | |
|---|---|---|---|
| 2010/0151327 A1 | 6/2010 | Nakahara et al. | |
| 2011/0033749 A1* | 2/2011 | Uchida | H01M 4/1315 429/223 |
| 2011/0133117 A1 | 6/2011 | Awano | |
| 2011/0278495 A1* | 11/2011 | Lamminmaki | B82Y 30/00 252/182.1 |
| 2013/0108928 A1 | 5/2013 | Ito et al. | |
| 2014/0079625 A1* | 3/2014 | Honma | C01G 23/005 423/598 |
| 2014/0322609 A1* | 10/2014 | Choi | C01G 23/005 429/231.1 |

FOREIGN PATENT DOCUMENTS

| | | |
|---|---|---|
| JP | H06 275263 A | 9/1994 |
| JP | 2001 192208 A | 7/2001 |
| JP | 2001 213622 A | 8/2001 |
| JP | 2002 211925 A | 7/2002 |
| JP | 2008 150232 A | 7/2008 |
| JP | 4153192 B | 9/2008 |
| JP | 2010 140863 | 6/2010 |
| JP | 2013 095647 A | 5/2011 |
| JP | 2011 113795 A | 6/2011 |
| WO | WO 2012/147856 A | 11/2012 |

* cited by examiner

*Primary Examiner* — Mark F. Huff
*Assistant Examiner* — Monique M Wills
(74) *Attorney, Agent, or Firm* — Jeffrey S. Melcher; Manelli Selter PLLC

(57) ABSTRACT

Provided is lithium titanate that is readily pulverized, and readily dispersed in a binding agent. The lithium titanate is characterized in that the value of a degree of pulverization Zd representing the ratio of the 50% cumulative diameter pre- and post-pulverization is 2 or greater. The lithium titanate is produced by the following steps (1)-(3). (1) a step in which titanyl sulfate or titanium sulfate is thermally hydrolyzed to produce metatitanic acid; (2) a step in which a slurry containing the metatitanic acid is prepared, and the slurry, subsequent to neutralization to bring the pH to 6.0-9.0, undergoes solid-liquid separation, to produce a metatitanic acid-containing titanium starting material having a BET specific surface area of 100-400 m$^2$/g, and in which the sulfuric acid (SO$_4$) content is 0.01-2.0 mass % with respect to the amount of metatitanic acid, on a TiO$_2$-converted basis; and (3) a step in which the titanium starting material and a lithium compound are mixed and baked.

17 Claims, No Drawings

PROCESS FOR MANUFACTURING LITHIUM TITANIUM OXIDES

This application is the national phase of international application PCT/JP2014/064398 filed 30 May 2014 which designated the U.S.

TECHNICAL FIELD

The present invention relates to lithium titanate and a method for producing the same, and more particularly to a lithium titanate granulated particle, a lithium titanate powder, and methods for producing the same. In addition, the present invention relates to a titanium raw material for producing the lithium titanate. Further, the present invention relates to an electrode using the lithium titanate, an electric storage device using the same, and methods for producing the same.

BACKGROUND ART

Electric storage devices, particularly lithium secondary batteries, become widespread rapidly for small batteries such as portable equipment power supplies, and further the development of large lithium secondary batteries for the electric power industry, automobiles, and the like is also promoted. Long-term reliability and high input and output characteristics are required of electrode active materials used in such electric storage devices, particularly lithium secondary batteries, and safety and life characteristics are required particularly of negative electrode active materials. Therefore, lithium titanate excellent in these characteristics is regarded as promising.

As the above lithium titanate, several compounds are present as described, for example, in Patent Literature 1. Patent Literature 1 describes lithium titanate represented by the general formula LixTiyO4 in which 0.8≤x≤1.4 and 1.6≤y≤2.2 and illustrates $LiTi_2O_4$, $Li_{1.33}Ti_{1.66}O_4$, $Li_{0.8}Ti_{2.2}O_4$, and the like as typical examples. As methods for producing such lithium titanate, a wet method in which predetermined amounts of a lithium compound and a titanium compound are mixed in a medium liquid, and the mixture is dried and then fired (Patent Literature 2), and, among the above wet method, a method of performing drying by spray drying (Patent Literature 3) are known. In addition, a dry method in which a titanium oxide having a specific surface area of 50 to 450 $m^2/g$ as measured by a BET one-point method by nitrogen adsorption is used as a raw material and mixed with a predetermined amount of a lithium compound, and the mixture is fired (Patent Literature 4), and the like are also known.

CITATION LIST

Patent Literature

Patent Literature 1: JPH 06-275263 A
Patent Literature 2: JP 2001-213622 A
Patent Literature 3: JP 2001-192208 A
Patent Literature 4: WO2012/147856

SUMMARY OF INVENTION

Technical Problem

Lithium titanate is produced by firing a lithium compound and a titanium compound in both the above dry method and wet method. But, a problem is that because of the solid phase diffusion reaction, the reactivity between the respective raw materials is low, and when the firing temperature is low, by-products having different compositions generate easily and the unreacted raw materials remain easily in addition to the target lithium titanate, and sufficient electric capacity is not obtained when the lithium titanate is used in a battery. On the other hand, when the firing temperature is raised, this is advantageous in terms of reactivity, but a problem is that the volatilization loss of lithium occurs easily, and the shrinkage, sintering, and grain growth of lithium titanate particles proceed, and therefore even if the lithium titanate is mixed with a binding agent when an electrode is made, the lithium titanate is difficult to pulverize and cannot be sufficiently dispersed. In addition, another problem is that the specific surface area of lithium titanate particles decreases, and the battery characteristics such as low temperature property and rate capability decrease easily when the lithium titanate is used in a battery.

Solution to Problem

The present inventors had made various studies in order to produce lithium titanate that is easily pulverized and easily dispersed when mixed with a binding agent in order to make an electrode, and as a result, we have found the present invention. The present invention is a lithium titanate granulated particle having a degree of grinding Zd, represented by the following formula 1, of 2 or more.

$$Zd = D50,1/D50,2 \quad \text{(Formula 1)}$$

wherein D50,1 is a cumulative 50% particle diameter (μm) of lithium titanate before grinding, and D50,2 is a cumulative 50% particle diameter (μm) of the lithium titanate after grinding such that 1 g of a sample is placed within a circle having an area of 2 $cm^2$ and pressed with a load at a pressure of 35 MPa applied, to the sample for 1 minute.

In addition, a method for producing lithium titanate according to the present invention comprises the following steps of (1) to (3). The present inventors have found that the desired lithium titanate that is easily pulverized and easily dispersed can be produced by thermally hydrolyzing titanyl sulfate or the like to produce metatitanic acid, adjusting the pH of a slurry of the metatitanic acid for neutralization, thereby producing metatitanic acid having a particular specific surface area and a particular sulfuric acid component content, then mixing the metatitanic acid and a lithium compound, and then firing the mixture, thereby completing the present invention.

(1) A step of thermal hydrolyzing titanyl sulfate or titanium sulfate to produce metatitanic acid;

(2) a step of preparing a slurry comprising the metatitanic acid, neutralizing the slurry to pH 6.0 to 9.0, and then subjecting the slurry to solid-liquid separation to produce a titanium raw material comprising metatitanic acid having a BET specific surface area of 100 to 400 $m^2/g$ and a content of a sulfuric acid component ($SO_4$) tp 2.0% by mass based on an amount of the metatitanic acid in terms of $TiO_2$; and (3) a step of mixing the titanium raw material and a lithium compound and then firing an obtained mixture.

In addition, in the present invention, in the step of (2), after the metatitanic acid is subjected to solid-liquid separation, the metatitanic acid may be dried and dry-ground to produce the titanium raw material comprising the metatitanic acid. The step of (3) may be a step of preparing a mixed slurry of the metatitanic acid-containing titanium raw material and a lithium compound and then firing the mixed slurry.

In addition, this step may be a step of preparing a mixed slurry of the titanium raw material and a lithium compound, then wet-grinding the mixed slurry, preferably wet-grinding the mixed slurry so that a cumulative 50% particle diameter of the titanium raw material is in a range of 0.5 to 3.0 µm, and then firing the mixed slurry. Further, a step of drying and granulating the mixed slurry before firing may be included. The firing temperature is preferably 600 to 950° C. The produced lithium titanate may be dry-ground.

Advantageous Effects of Invention

The lithium titanate of the present invention is lithium titanate that can be easily pulverized and easily dispersed when mixed with a binding agent in order to make an electrode, and the extent of grinding before mixing with a binding agent or grinding in mixing can be lowered, or these grindings need not be performed. When the lithium titanate obtained in this manner is mixed with a binding agent, it is dispersed well, and the mixture can be firmly fixed to a current collector to make an electrode having the desired characteristics, and the electrode can be used to make the desired electric storage device.

In addition, the method for producing lithium titanate according to the present invention is a method of thermally hydrolyzing titanyl sulfate or the like to produce metatitanic acid, adjusting the pH of a slurry comprising the metatitanic acid for neutralization, thereby producing a titanium raw material comprising metatitanic acid having a particular specific surface area and a particular sulfuric acid component content, then mixing the metatitanic acid-containing titanium raw material and a lithium, compound, and then firing the mixture. According to such a method, the desired lithium titanate that is easily pulverized and is soft can be produced.

DESCRIPTION OF EMBODIMENTS

The present invention is a lithium titanate granulated particle having a degree of grinding Zd, represented by the following formula 1, of 2 or more, $$Zd = D50,1/D50,2 \quad \text{(Formula 1)}$$

The degree of grinding Zd is an indicator showing the degree of ease of pulverization, and when it is 2 or more, pulverization is easy. For the lithium titanate granulated particle having a degree of grinding Zd in this range, the extent of finish grinding can be lowered, or finish grinding need not be performed, and the lithium titanate granulated particle is dispersed well when mixed with a binding agent. The degree of grinding Zd is preferably 2 to 20, more preferably in the range of 3 to 19, and further preferably in the range of 4 to 18. When the degree of grinding Zd is smaller than 2, strong grinding is required, and the lithium titanate granulated particle is not sufficiently mixed with and dispersed in a binding agent.

The degree of grinding Zd is represented by the ratio of measured cumulative 50% particle diameters before and after grinding, D50,1/D50,2. D50,1 is the cumulative 50% particle diameter (µm) of the lithium titanate granulated particle before grinding, and D50,2 is the cumulative 50% particle diameter (µm) of the lithium titanate after grinding such that 1 g of a sample is placed within a circle having an area of 2 cm² and ground with a load at a pressure of 35 MPa applied to the sample for 1 minute.

The apparatus used for the grinding is not particularly limited, and known dry grinders can be used. For example, flake crushers, hammer mills, pin mills, Bantam mills, jet mills, cyclone mills, fret mills, pan mills, edge runners, roller mills, Mix Muller, vibration mills, sample mills, grinding machines, and the like can be used.

In addition, the term granulated particle is used for distinction from a powder after grinding and does not necessarily mean having undergone some granulation step, but the granulated particle has preferably undergone a granulation step.

The cumulative 50% particle diameter of the lithium titanate granulated particle (represented by D50 here and being one before grinding, the same as D50,1) is preferably in the range of 0.5 to 50 µm, more preferably 0.5 to 30 µm, and further preferably 0.5 to 10 µm. When the cumulative 50% particle diameter of the lithium titanate granulated particle is in the above range, the handling properties are good, and even if the lithium titanate granulated particle is used as it is, the lithium titanate granulated particle is firmly fixed to a current collector of an electrode and does not come off easily, because the number of secondary particles having a large particle size is small, and therefore such a range is preferred. In addition, the particle size distribution of the lithium titanate granulated particle is preferably narrower. For example, when the particle size distribution, of the lithium titanate granulated particle is represented by a parameter SD value showing a particle size distribution obtained from a cumulative 10% particle diameter (D10) and a cumulative 90% particle diameter (D90) by formula 2, the parameter SD value is preferably 2.0 to 8.0 µm, more preferably 3.0 to 6.0 µm, and further preferably 3.5 to 4.5 µm.

$$SD(\mu m) = (D90 - D10)/2 \quad \text{(Formula 2)}$$

In addition, the lithium titanate granulated particle is easily pulverized, and therefore also when the 330 mesh sieve residue is measured, the lithium titanate granulated particle is pulverized, and the 330 mesh sieve residue is likely to be 0.1% by mass or less. When the 330 mesh sieve residue is 0.1% by mass or less, the number of coarse grains formed by the aggregation of secondary particles in firing is small, and therefore the lithium titanate granulated particle is firmly fixed to a current collector of an electrode and does not come off easily, which is preferred. The 330 mesh sieve residue is more preferably 0.05% by mass or less, further preferably 0.02% by mass or less.

In addition, the present invention relates to a lithium titanate powder obtained by grinding a lithium titanate granulated particle. The cumulative 50% particle diameter (D50) of the lithium titanate powder of the present invention is preferably 0.1 to 5 µm, more preferably 0.5 to 5 µm. When the cumulative 50% particle diameter of the lithium titanate powder is in the range of 0.1 to 5 µm, the handling properties are good, and the number of coarse grains is small, and therefore the lithium titanate powder is firmly fixed to a current collector of an electrode and does not come of easily, which is preferred. The cumulative 50% particle diameter is more preferably 0.5 to 3 µm, further preferably 0.5 to 2 µm.

In addition, the particle size distribution of the lithium titariate powder is preferably narrower. For example, when the particle size distribution of the lithium titanate powder is represented by a parameter SD value showing a particle size distribution obtained from a cumulative 10% particle diameter (D10) and a cumulative 90% particle diameter (D90) by the above formula 2, the parameter SD value is preferably 0.2 to 3.0 µm, more preferably 0.3 to 2.5 µm, and further preferably 0.5 to 2.0 µm.

In addition, when the 330 mesh sieve residue of the lithium titanate powder is 0.1% by mass or less, the number of coarse grains formed by the aggregation of secondary particles in firing is small, and therefore the lithium titanate powder is firmly fixed to a current collector of an electrode and does not come off easily, which is preferred. The 330 mesh sieve residue is more preferably 0.05% by mass or less, further preferably 0.02% by mass or less.

In addition, the lithium titanate (granulated particle and powder) of the present invention preferably has the following physical properties described in (1) to (3).

(1) Composition

The lithium titanate of the present invention includes compounds having various compositions and is specifically lithium titanate represented by the general formula $Li_xTiO_4$ in which $0.8 \leq x \leq 1.4$ and $1.6 \leq y \leq 2.2$. As a typical one, $LiTi_2O_4$, $Li_{1.33}Ti_{1.66}O_4$ ($Li_4Ti_5O_{12}$), $Li_{0.8}Ti_{2.2}O_4$, or the like can be arbitrarily prepared.

(2) Single Phase Rate

The single phase rate is an indicator represented by the following formula 3 and showing the content of the target lithium titanate and is preferably 90% or more, more preferably 93% or more, more preferably 95% or more, more preferably 96% or more, further preferably 97% or more, and further preferably 98% or more.

$$\text{single phase rate}(\%) = 100 \times (1 - \Sigma(Yi/X)) \quad \text{(Formula 3)}$$

Here, X is the main peak intensity of the target lithium titanate in powder X-ray diffraction measurement using Cukα rays, and Yi is the main peak intensity of each subphase. In the case of $Li_4Ti_5O_{12}$, X is peak intensity around $2\theta=18°$, and anatase type or rutile type $TiO_2$ and $Li_2TiO_3$ are likely to present as subphases, and therefore peak intensity around $2\theta=25°$ (anatase type $TiO_2$), peak intensity around $2\theta=27°$ (rutile type $TiO_2$), and peak intensity around $2\theta=44°$ ($Li_2TiO_3$) are used for Yi.

(3) BET Specific Surface Area, Bulk Density, Amount of Oil Absorption, and the Like The lithium titanate preferably has a large specific surface area because the battery characteristics are good. Specifically, the specific surface area is preferably 5 to 50 $m^2/g$, more preferably 5 to 20 $m^2/g$, and further preferably 5 to 10 $m^2/g$.

In addition, the bulk density of the lithium titanate can be appropriately adjusted, and the bulk density is preferably 0.1 to 0.8 $g/cm^3$, more preferably 0.2 to 0.7 $g/cm^3$, more preferably 0.4 to 0.6 $g/cm^3$, and further preferably 0.4 to 0.5 $g/cm^3$. The tap density can also be appropriately adjusted, and the tap density is desirably 0.4 to 1.2 $g/cm^3$, more preferably 0.5 to 1.0 $g/cm^3$, and further preferably 0.6 to 0.8 $g/cm^3$.

The amount of oil absorption of the lithium titanate is preferably 10 to 50 g/100 g, more preferably 10 to 40 g/100 g, more preferably 15 to 40 g/100 g, further preferably 20 to 40 g/100 g, and further preferably 20 to 35 g/100 g. The amount of oil absorption is the amount of oil required for kneading the lithium titanate, and the amount of a binding agent required when an electrode is made, and the peel strength of an electrode can be predicted from the amount of oil absorption. When the amount of oil absorption is in the range of 10 to 50 g/100 g, particularly 10 to 40 g/100 g, the amount of a binding agent is also an appropriate amount, and the lithium titanate can be firmly fixed on a current collector by the binding agent, and, for example, a preferred numerical value of 3 or less is shown in the evaluation of peel strength using the Cross-cut test JIS K5600-5-6 (ISO2409).

In addition, the amount of impurities is preferably small, and specifically, the following ranges are more preferred: sodium (1000 ppm or less), potassium (500 ppm or less), silicon (1000 ppm or less), calcium (1000 ppm or less), iron (500 ppm or less), chromium (500 ppm or less), nickel (500 ppm or less), manganese (500 ppm or less), copper (500 ppm or less), zinc (500 ppm or less), aluminum (500 ppm or less), magnesium (500 ppm or less), niobium (0.3% by mass or less), zirconium (0.2% by mass or less), $SO_4$ (1.0% by mass or less), chlorine (1.0% by mass or less), or the like.

Next, a titanium raw material for producing lithium titanate comprises metatitanic acid having a BET specific surface area of 100 to 400 $m^2/g$ and a content of a sulfuric acid component ($SO_4$) of 0.01 to 2.0% by mass based on the amount of the metatitanic acid in terms of $TiO_2$. The content of the sulfuric acid component ($SO_4$) is preferably 0.2 to 2.0% by mass based on the amount of the metatitanic acid in terms of $TiO_2$. The metatitanic acid includes a compound represented by $TiO(OH)_2$ or $TiO_2 \cdot H_2O$ and a non-stoichiometric compound represented by $TiO_{2-n}(OH)_{2n}$ or $TiO_2 \cdot nH_2O$ ($0<n<1$) having a similar composition and is different from orthotitanic acid represented by $Ti(OH)_4$ or $TiO_2 \cdot 2H_2O$ obtained by neutralizing titanium tetrachloride and is also different from titanium dioxide represented by $TiO_2$ obtained by firing metatitanic acid or orthotitanic acid at a temperature of 500 to 1000° C. The titanium raw material should comprise as the main component preferably 70% by mass or more, more preferably 90% by mass or more, and further preferably 95% by mass or more of metatitanic acid and may comprise as accessory components a seed (nuclear crystal) added in hydrolysis described later, orthotitanic acid or salts thereof, titanic acid or salts thereof, titanium dioxide, titanium oxide, and the like.

The BET specific surface area of the metatitanic acid is preferably 150 to 400 $m^2/g$, more preferably 250 to 400 $m^2/g$, and further preferably 300 to 350 $m^2/g$ because the reactivity with a lithium compound is good. When the BET specific surface area of the metatitanic acid is smaller than 100 $m^2/g$, the reactivity with a lithium compound worsens, which is not preferred. On the other hand, when the BET specific surface area of the metatitanic acid is larger than 400 $m^2/g$, the metatitanic acid is fine, and therefore solid-liquid separation is difficult, which is not preferred.

The content of the sulfuric acid component ($SO_4$) in the metatitanic acid is preferably low, because the sulfuric acid component reacts with a lithium compound to produce lithium sulfate as a by-product. The content of the sulfuric acid component is preferably 0.2 to 2.0% by mass, more preferably 0.2 to 1.5% by mass, and more preferably 0.2 to 0.7% by mass based on the amount of the metatitanic acid in terms of $TiO_2$ considering industrial productivity.

In addition, the content of alkali metals, alkaline earth metals, and the nitrogen of ammonia, amines, and the like in the metatitanic acid represented by the total amount is preferably 2% by mass or less, more preferably 1% by mass or less, and further preferably 0.5% by mass based on the metatitanic acid. In particular, the contents of the alkali metals and the alkaline earth metals are each 0.2% by mass or less, and the content of nitrogen is preferably 1% by mass or less, more preferably 0.8% by mass or less, and further preferably 0.5% by mass. The metatitanic acid preferably has high purity and usually preferably has a purity of 90% by mass or more, more preferably 99% by mass or more. In addition, for the content of other elements, specifically, the following ranges based on the metatitanic acid are more preferred: silicon (1000 ppm or less), calcium (1000 ppm or less), iron (1000 ppm or less), niobium (0.3% by mass or less), and zirconium (0.2% by mass or less).

In addition, the metatitanic acid is preferably fine in terms of reactivity with a lithium compound, and the average primary particle diameter (electron microscope method) is preferably in the range of 0.001 μm to 0.3 μm, more preferably 0.005 to 0.05 μm, and more preferably in the range of 0.005 μm to 0.03 μm.

Methods for measuring the respective characteristics of the lithium titanate (granulated particle and powder), the metatitanic acid, the titanium raw material, the lithium compound, and the mixture will be described.

(1) BET Specific Surface Area

The specific surface area is measured by a BET one-point method by nitrogen adsorption. For the apparatus, Monosorb manufactured by YUASA IONICS or Monosorb model number MS-22 manufactured by Quantachrome Instruments was used.

(2) Particle Diameter (Metatitanic Acid)

The average particle diameter of the primary particles of the metatitanic acid is obtained by measuring the particle diameters of 100 primary particles in an image using a transmission electron microscope, and taking the average value (electron microscope method).

In addition, the cumulative 50% particle diameter of the metatitanic acid is measured by a laser diffraction method. Specifically, a laser diffraction/scattering type particle size distribution measuring apparatus is used, pure water is used for a dispersion medium, the refractive index is 1.33 for the pure water, and 2.52 is used for the refractive index of the metatitanic acid. For the laser diffraction/scattering type particle size distribution measuring apparatus, LA-950 manufactured by HORIBA, Ltd. was used.

(3) Particle Diameter (Lithium Titanate)

The cumulative 10% particle diameter (D10), cumulative 50% particle diameter (D50), and cumulative 90% particle diameter (D90) of the lithium titanate are measured by a laser diffraction method. Specifically, measurement is performed by using a laser diffraction/scattering type particle size distribution measuring apparatus, using pure water for a dispersion medium, setting the refractive index at 1.33 for the water, and appropriately setting the refractive index according to the compound species for the lithium titanate. When the lithium titanate is $Li_4Ti_5O_{12}$, 2.70 is used for the refractive index. In addition, in the present invention, for the laser diffraction/scattering type particle size distribution measuring apparatus, LA-950 manufactured by HORIBA, Ltd. was used.

(4) Particle Diameter (Lithium Compound)

The cumulative 50% particle diameter of the lithium compound is measured by a laser diffraction method. Specifically, the cumulative 50% particle diameter of the lithium compound is measured by using a laser diffraction/scattering type particle size distribution measuring apparatus, using ethanol for a dispersion medium, setting the refractive index at 1.36 for the ethanol, and appropriately setting the refractive index according to the compound species for the lithium compound. For example, when the lithium compound is lithium carbonate, 1.50 is used for the refractive index. As the laser diffraction/scattering type particle size distribution measuring apparatus, LA-950 manufactured by HORIBA, Ltd. was used.

(5) Particle Diameter (Mixture (Dry Material and Granulated Material))

When the mixture of the titanium raw material and the lithium compound is a dry material and a granulated material, the cumulative 50% particle diameter is measured by a laser diffraction method. Specifically, a laser diffraction/scattering type particle size distribution measuring apparatus is used, water is used for a dispersion medium, the refractive index is 1.33 for the water, and when the lithium compound is lithium carbonate, 2.52, the refractive index of the metatitanic acid higher than that of lithium carbonate, is used for the refractive index of the mixture. For the laser diffraction/scattering type particle size distribution measuring apparatus, LA-950 manufactured by HORIBA, Ltd. was used.

(6) Bulk Density and Amount of Oil Absorption

The bulk density is obtained by a cylinder method (placing a sample in a cylinder and calculating from the volume and the mass). In addition, the tap density is calculated by tapping a cylinder containing a sample 200 times from a height of 5 cm.

The amount of oil absorption conforms to JIS K-5101-13-2. The amount of oil absorption is represented by the amount of boiled linseed oil used per 100 g of a sample (Formula 4) when the sample and the boiled linseed oil are mixed little by little, and a state in which the mixture can be spirally wound using a spatula is reached.

$$\text{the amount of oil absorption (g/100 g)} = \text{the amount of boiled linseed oil (g)/sample mass (g)} \times 100 \quad \text{(Formula 4)}$$

(7) 330 Mesh Sieve Residue

The 330 mesh sieve residue is represented by oversize (the mass percentage of the granulated particle or the powder remaining on a 330 mesh sieve to the total amount of the powder) using a 330 mesh standard sieve based on JIS Z 8901 "Test powders and test particles."

(8) Peel Strength

The peel strength is evaluated in 6 grades from 0 to 5 using the Cross-cut test JIS K5600-5-6 (ISO2409). As the numerical value becomes smaller, stronger peel strength is indicated.

(9) Single Phase Rate

The single phase rate is represented by (Formula 3) single phase rate (%)=$100 \times (1-\Sigma(Yi/X))$.

Here, X is the main peak intensity of the target lithium titanate in powder X-ray diffraction measurement using Cukα rays, and Yi is the main peak intensity of each subphase. For the powder X-ray diffraction apparatus, Ultima IV manufactured by Rigaku Corporation was used.

(10) Impurities

Sodium and potassium that are impurities are measured by an atomic absorption method, $SO_4$ and chlorine are measured by an ion chromatography method or a fluorescent X-ray measuring apparatus, and other elements such as silicon, calcium, iron, chromium, nickel, manganese, copper, zinc, aluminum, magnesium, niobium, and zirconium are measured by an ICP method. For $SO_4$, a fluorescent X-ray measuring apparatus (RIGAKU RIX-2200) was used. Ammonia was liberated with a strong alkali and then measured by a neutralization titration method.

Next, a method for producing lithium titanate according to the present invention comprises the following steps:

(1) the step of thermally hydrolyzing titanyl sulfate or titanium sulfate to produce metatitanic acid;

(2) the step of preparing a slurry comprising the metatitanic acid, neutralizing the slurry to pH 6.0 to 9.0, and then subjecting the slurry to solid-liquid separation to produce a titanium raw material comprising metatitanic acid having a BET specific surface area of 100 to 400 m²/g and a content of a sulfuric acid component ($SO_4$) of 0.01 to 2.0% by mass, preferably 0.2 to 2.0% by mass, based on the amount of the metatitanic acid in terms of $TiO_2$; and (3) the step of mixing the titanium raw material and a lithium compound and then firing the obtained mixture.

First, the step of (1) is the step of producing metatitanic acid, and titanyl sulfate or titanium sulfate dissolved in a solvent such as water is thermally hydrolyzed. The temperature of the hydrolysis is preferably 80 to 95° C., more preferably 87 to 93° C. 0.1 to 1.0% by mass of a seed (nuclear crystal) is preferably added in the hydrolysis because the hydrolysis proceeds easily. The produced metatitanic acid is in a slurry state and may be subjected to solid-liquid separation and washed as required. In this case, for example, the metatitanic acid is suspended in a solvent such as water, an alcohol, hexane, toluene, methylene chloride, a silicone, or the like and is in slurry state again.

Next, the step of (2) is the step of removing the sulfuric acid component ($SO_4$) contained in the metatitanic acid to produce a titanium raw material comprising the metatitanic acid, and the slurry comprising the metatitanic acid is neutralized to pH 6.0 to 9.0, and then the slurry is subjected to solid-liquid separation for separation from the water-soluble sulfate. When the slurry pH is adjusted in the range of 6.0 to 9.0, the content of the sulfuric acid component ($SO_4$) can be the desired amount, and the amount of the remaining neutralizing agent can also be decreased. A preferred pH is 6.5 to 8.0, more preferably 7.0 to 7.5, and further preferably 7.0 to 7.4. For the added neutralizing agent, an alkali compound is used, and those that do not remain in lithium titanate are preferred, and, for example, compounds such as ammonia, ammonium compounds such as ammonium hydroxide, amine compounds such as alkanolamines, or the like are more preferred.

The solid concentration of the slurry comprising the metatitanic acid is not particularly limited but, for example, is preferably adjusted at a solid concentration of 10 to 30% by mass. The slurry temperature is not particularly limited but is usually in the range of 10 to 30° C. Usual apparatuses, filter filtration machines, vacuum filtration machines, and the like can be used for the solid-liquid separation. After the solid-liquid separation, washing and drying may be performed as required. The drying temperature is preferably 50 to 500° C., more preferably 50 to 300° C., and further preferably 50 to 250° C. When drying is performed at a temperature higher than 500° C., the BET specific surface area of the metatitanic acid decreases, and the metatitanic acid completely changes to titanium dioxide crystals, which is not preferred. In this manner, the metatitanic acid having a BET specific surface area of 100 to 400 $m^2/g$ and a content of the sulfuric acid component ($SO_4$) of 0.01 to 2.0% by mass, preferably 0.2 to 2.0% by mass, based on the amount of the metatitanic acid in terms of $TiO_2$ can be produced. In addition, in the metatitanic acid produced in this manner, the content of alkali metals, alkaline earth metals, and the nitrogen of ammonia, amines, and the like can be decreased, and the content represented by the total amount is preferably 2% by mass or less, more preferably 1% by mass or less, and further preferably 0.5% by mass based on the metatitanic acid. In particular, the alkali metals and the alkaline earth metals are each 0.2% by mass or less, and the content of nitrogen is preferably 1% by mass or less, more preferably 0.8% by mass or less, and further is preferably 0.5% by mass.

Further, after drying, dry grinding is preferably performed as required because the burden of wet grinding in the step of (3) is small. For the dry grinder, usual ones can be used. Examples thereof include flake crushers, hammer mills, pin mills, Bantam mills, jet mills, cyclone mills, fret mills, pan mills, edge runners, roller mills, Mix Muller, vibration mills, and the like. The metatitanic acid produced in this manner can be a titanium raw material, and orthotitanic acid or salts thereof, titanic acid or salts thereof, titanium dioxide, titanium oxide, and the like may be mixed as required to provide a titanium raw material.

Next, in the step of (3), the titanium raw material and a lithium compound are mixed, and then the obtained mixture is fired. The titanium raw material produced in the previous step (2) is in a wet state like a cake, a slurry state, or a dry state, and the titanium raw material and the lithium compound can be mixed. The titanium raw material in a wet state or a slurry state is preferably used because the titanium raw material easily comes into contact with the lithium compound, and a mixture in which the reactivity of the titanium raw material and the lithium compound is high is easily obtained. The method of performing mixing in such a wet state or a slurry state is referred to as a wet method and is more preferred than a dry method in which the titanium raw material in a dry state and the lithium compound are mixed.

The mixing machine for mixing the titanium raw material in a wet state or a dry state and the lithium compound is not particularly limited, and usual stirrers, mixing machines, mixers, kneaders, dry grinders, and the like can be used.

For the lithium compound, hydroxides, salts, oxides, and the like can be used without particular limitation. Examples thereof include lithium hydroxide, lithium carbonate, lithium nitrate, lithium sulfate, lithium oxide, or the like. One of these can be used, or two or more of these may be used in combination. Among the above lithium compounds, in order to avoid the remaining of acidic radicals in the lithium titanate, lithium hydroxide, lithium carbonate, and lithium oxide are preferably used, lithium hydroxide and lithium carbonate are more preferably used, and lithium hydroxide is further preferred. The lithium compound preferably has high purity and usually preferably has a purity of 98.0% by mass or more. For example, when lithium hydroxide monohydrate is used as the lithium compound, it is preferable that LiOH is 56.0% by mass or more, preferably 57.0% by mass or more, and impurity metal elements such as Na, Ca, K, Mg, or the like are 1000 ppm or less, preferably 500 ppm or less respectively, and Cl and $SO_4$ are 1000 ppm or less, preferably 500 ppm or less respectively in the present invention, the acidic radicals mean a sulfate radical ($SO_4$) and a chlorine radical (Cl).

The blending ratio of the lithium compound to the titanium raw material should be adjusted to the composition of the target lithium titanate. For example, when $Li_4Ti_5O_{12}$ is produced as the lithium titanate, the lithium compound and the titanium raw material are blended so that the Li/Ti ratio is in the range of 0.79 to 0.85.

In addition, a mixed slurry of the titanium raw material produced in the previous step (2) and the lithium compound is preferably prepared. For the mixed slurry, for example, the titanium raw material and the above lithium compound are suspended or dissolved in a solvent such as water, an alcohol, hexane, toluene, methylene chloride, a silicone, or the like to form a slurry. The lithium compound may be soluble in the solvent or insoluble. A solution in which the lithium compound is dissolved, and the titanium raw material in a wet state or a dry state or the titanium raw material in a slurry state are preferably mixed. The apparatus for making the mixed slurry is not particularly limited, and usual stirrers, mixing machines, mixers, wet grinders, and the like can be used. The solid concentration of the slurry is not particularly limited but, for example, is adjusted at a solid concentration of 10 to 30% by mass. The slurry temperature is not particularly limited but is usually adjusted in the range of 10 to 30° C.

Next, this mixed slurry comprising the titanium raw material and the above lithium compound is more preferably wet-ground. The wet grinding means the operation of performing dispersion or grinding while preventing the agglomeration (becoming massive) of the slurry components, using a grinder or a disperser that can apply strong shear force. The apparatus used for the wet grinding is not especially limited as long as the objects of the present invention can be achieved. For example, wet medium stirring mills (wet grinders) such as batch type bead mills such as basket mills, horizontal, vertical, and annular continuous bead mills, sand grinder mills, ball mills, and the like are illustrated. As the beads used in the wet medium stirring mills, beads comprising glass, alumina, zirconia, steel, flint, or the like as a raw material can be used.

In the present invention, the cumulative 50% particle diameter of the titanium raw material in the mixed slurry is preferably adjusted in the range of 0.5 to 3.0 μm, more preferably in the range of 0.5 to 2.0 μm, by wet grinding. When the cumulative 50% particle diameter of the titanium raw material is larger than 3.0 μm, the reactivity with a lithium compound worsens, which is not preferred.

The lithium compound should be soluble in the solvent. But, when the lithium compound is insoluble, the lithium compound is also preferably made fine by wet grinding, and the cumulative 50% particle diameter of the lithium compound particles is preferably adjusted in the range of 0.3 to 3.0 μm, more preferably in the range of 2.0 to 3.0 μm.

When the above mixture is a cake in a wet state, the mixture may be dried as required. When the mixture is in a state of a slurry, the mixture may be subjected to solid liquid separation, dried, and granulated as required, and is preferably dried for firing. The drying is not particularly limited, and usual dryers can be used, and, for example, heat dryers, hot air dryers, reduced-pressure, vacuum dryers, or the like can be used. For the sample for drying, a cake in a wet state, a thick slurry, and the like can be used. The cake in a wet state may be obtained by directly mixing the titanium raw material in a wet state and the lithium compound or subjecting a mixed slurry of both to solid-liquid separation. Specifically, a method of instantaneously dispersing and drying a cake- or slurry-like water-containing powder in a high temperature and high speed airflow like a spin flash dryer is preferred.

In addition, spray drying in which solid-liquid separation, drying, and granulation can be performed by one method is more preferably performed. For the spray drying of the mixed slurry, conventionally known methods such as a rotating disk method, a pressure nozzle method, a two-fluid nozzle method, a four-fluid nozzle method, and the like can be adopted. Particularly, the four-fluid nozzle method is preferred because spherical fine particle aggregates having a uniform particle size distribution can be obtained, and it is easy to control the average particle diameter. The drying temperature at this time is different depending on the mixed slurry concentration, the treatment speed, and the like. When a spray dryer is used, for example, conditions such as a spray dryer inlet temperature of 100 to 300° C. and an outlet temperature of 40 to 200° C. are preferred. The spraying speed is not especially limited, but usually spraying is performed at a spraying speed in the range of 0.5 to 3 L/min. When an atomizer type spray dryer is used, treatment is performed, for example, at 10000 to 40000 rpm (revolutions/min), but this range is not limiting.

When the mixed slurry is granulated by spray drying or the like in this manner and granulated particles are used as secondary particles, the cumulative 50% particle diameter (laser diffraction method) is preferably 3 to 15 μm, more preferably 5 to 12 μm, and further preferably 7 to 8 μm.

The bulk density of the dry material or the granulated material is preferably 0.1 to 0.8 g/cm$^3$, more preferably 0.2 to 0.7 g/cm$^3$, more preferably 0.4 to 0.6 g/cm$^3$, and more preferably 0.4 to 0.5 g/cm$^3$. When the bulk density is lower than the above range, depending on the firing furnace, the amount charged per apparatus decreases, and the production ability decreases. In the heating step, gas generated during the reaction does not come out easily, heat conduction is inhibited, and the like, and also this case is not preferred because the reactivity decreases. As a result, in either case, the single phase rate of the obtained lithium titanate decreases easily.

In addition, the mixture in a wet state or a dry state, the dry material, or the granulated material obtained by mixing the titanium raw material and the lithium compound may be dried, ground, and pressurized as required. Generally, a material having a large specific surface area is bulky (has low bulk density) and has large occupied volume per mass, and therefore the productivity, for example, throughput (the amount of the material charged) per unit time or equipment, decreases. Therefore, the mixture is preferably ground and pressurized to moderate bulk density. By grinding and pressurizing the mixture, the titanium raw material and the lithium compound easily come into contact with each other, and a mixture in which the reactivity of the titanium raw material and the lithium compound is high is easily obtained, which is preferred.

As the means for grinding, the above-described known grinders, for example, jet mills, cyclone mills, and the like can be used. As the means for pressurizing, means for applying pressure (compressing), means for applying pressure (compressing) and grinding, and the like can be used, and known pressure molding machines and compression molding machines can be used. Examples thereof include roller compactors, roller crushers, pellet molding machines, and the like. In the case of pressurization, when the applied pressure to the powder is 58.8 MPa or less, a precursor mixture having a bulk density in the above range is easily obtained. The applied pressure is more preferably less than 49.0 MPa, further preferably 14.7 to 44.1 MPa.

Next, the above mixture or the like obtained by mixing the titanium raw material and the lithium compound is placed in a heating furnace, heated to a predetermined temperature, and maintained for a certain time for firing. The mixture may be in a state of a mixed slurry, may be in a wet state, or may be a dried, granulated, or ground and pressurized one. When the mixture is in a state of a mixed slurry, it may be placed in the heating furnace by spraying it into the heating furnace, or the like. When the mixture is in other states, it can be placed in the heating furnace by gas transport such as air, or the like, or machinery transport such as a conveyor belt, a bucket elevator, or the like. As the heating furnace, for example, fluidized furnaces, stationary furnaces, rotary kilns, tunnel kilns, or the like can be used.

The firing temperature is preferably a temperature of 600° C. or more and preferably 950° C. or less. For example, in the case of $Li_4Ti_5O_{12}$, when the firing temperature is lower than 600° C., the single phase rate of the target lithium titanate is low, and the amount of the unreacted titanium raw material is large, which is not preferred. On the other hand, when the firing temperature is higher than 950° C., impurity phases ($Li_2TiO_3$ and $Li_2Ti_3O_7$) are produced, which is not preferred. A preferred firing temperature is 650° C. to 800° C., more preferably 680 to 780° C., and further preferably 700 to 750°. When the firing temperature is in this range, the above-described single phase rate can be in a preferred range, and lithium titanate with suppressed sintering and grain growth can be stably produced.

The firing time can be appropriately set, and about 3 to 6 hours is appropriate. The firing atmosphere is not limited, but oxidizing atmospheres such as the air, oxygen gas, or the like, non-oxidizing atmospheres such as nitrogen gas, argon gas, or the like, and reducing atmospheres such as hydrogen gas, carbon monoxide gas, or the like are preferable, and oxidizing atmospheres are preferred. Pre-firing may be performed but is not particularly required.

In the lithium titanate obtained in this manner, little sintering and grain growth have occurred, and pulverization is easy, and therefore the lithium titanate can be used in the step of making an electrode after cooling without grinding. But, the step (4) of further dry-grinding the lithium titanate produced in the above step of (3) may be performed as required. The lithium titanate obtained in the present invention is easily pulverized as described above. But, when dry-grinding is performed, the lithium titanate is much more easily pulverized, and is easily dispersed in a paste when an electrode of an electric storage device is made. For the grinding, known dry grinders can be used. Examples thereof include flake crushers, hammer mills, Bantam mills, jet mills, cyclone mills, fret mills, pan mills, edge runners, roller mills, Mix Muller, vibration mills, and the like. In addition, the lithium titanate obtained by firing, or the lithium titanate subjected to dry grinding may be passed through a sieve and classified to decrease coarse grains and remove coarse impurities and the like, or shaped into a certain size to decrease fine grains.

Next, the present invention is an electric storage device electrode characterized by comprising as an electrode active material the lithium titanate not subjected to dry grinding, or the lithium titanate subjected to dry grinding, or further the lithium titanate passed through a sieve and classified described above.

In addition, the present invention is an electric storage device characterized by using the lithium titanate of the present invention described above. This electric storage device comprises the above electrode, a counter electrode to the electrode, and an electrolyte and comprises a separator as required. The electrode is obtained by using the lithium titanate of the present invention for an electrode active material, adding a binding agent (binder) to the lithium titanate, further adding a conductive material as required, appropriately molding or applying the mixture, and fixing the mixture to a current collector. Examples of the binding agent (binder) include fluororesins such as polytetrafluoroethylene, polyvinylidene fluoride, fluororubbers, styrene butadiene rubbers, water-based resins such as carboxymethyl cellulose polyacrylic acid, or the like. Examples of the conductive material include conduction aids such as carbon black, acetylene black, ketjen black, or the like. In the case of a lithium battery, the above electrode active material can be used for the positive electrode, and metal lithium, a lithium alloy or the like, or a carbon-containing substance such as graphite, or the like can be used as the counter electrode. Alternatively, the above electrode active material can be used as the negative electrode, and a lithium-transition metal complex oxide such as lithium-manganese complex oxide, lithium-cobalt complex oxide, lithium-nickel complex oxide, lithium-cobalt-manganese-nickel complex oxide, lithium-vanadium complex oxide, or the like an olivine type compound such as a lithium-iron-complex phosphoric acid compound, or the like can be used for the positive electrode. For the separator, a porous polypropylene film or the like is used in either case, and for the electrolyte, a material in common use such as a solution obtained by dissolving a lithium salt such as $LiPF_6$, $LiClO_4$, $LiCF_3SO_3$, $LiN(CF_3SO_2)_2$, $LiBF_4$, or the like in a solvent such as propylene carbonate, ethylene carbonate, dimethyl carbonate, diethyl carbonate, ethyl methyl carbonate, γ-butyrolactone, 1,2-dimethoxyethane, or the like can be used. The lithium titanate of the present invention may be used not only as an active material of a lithium secondary battery but by being adhered to the surface of another type of active material, blended in an electrode, or contained in a separator, or as a lithium ion conductor, or the like. In addition, the lithium titanate of the present invention may be used as an active material of a sodium ion battery.

EXAMPLES

Examples of the present invention will be shown below, but these do not limit the present invention.

Example 1

(1) Making of Metatitanic Acid 0.5% by mass of a metatitanic acid seed (nuclear crystal) in terms of $TiO_2$ was added to a 220 g/L sulfuric acid aqueous solution of titanyl sulfate in terms of $TiO_2$ followed by heating at 90° C. for 4 hours to obtain a mixture of a metatitanic acid precipitate and sulfuric acid. Then, the precipitate was filtered and washed by a suction filtration machine and then repulped to obtain an aqueous slurry having a $TiO_2$ concentration of 220 g/L.

(2) Making of Titanium Raw Material

Next, while 10 L of the above metatitanic acid slurry (concentration 220 g/L) was stirred, ammonia water (16.5%) was added over 25 minutes until the pH of the slurry reached 7.3. The slurry was aged for 2 hours followed by filtration and washing by a suction filtration machine and drying at 150° C. for 15 hours. The obtained dry material was ground by a hammer mill to make a titanium raw material (sample a).

(3) Making of Lithium Titanate 1.9 kg of lithium hydroxide monohydrate was dissolved in 13 L of pure water, and the titanium raw material obtained by the above method was added. The mixture was stirred for 30 minutes to prepare a mixed slurry having a titanium raw material concentration of 23% by mass in terms of $TiO_2$. Then, the mixed slurry was wet-ground in a bead mill to set the cumulative 50% particle diameter of the titanium raw material at 1.1 μm. The viscosity of the slurry after the grinding was 1200 mPa·s.

Then, the inlet temperature and outlet temperature of a spray dryer (L-8i model manufactured by Ohkawara Kakohki Co., Ltd.) were adjusted at 190° C. and 90° C., respectively, and the above mixed slurry was spray-dried. The granulated particle obtained by the spray drying was placed in a heating furnace and fired in the air at a temperature of 700° C. for 3 hours to obtain a lithium titanate granulated particle of the present invention (sample A).

Example 2

Metatitanic acid (sample b) and a lithium titanate granulated particle (sample B) were obtained as in Example 1 except that in (2) of Example 1, the neutralization pH was 6.9 instead of 7.3.

Example 3

Metatitanic acid (sample c) and a lithium titanate granulated particle (sample C) were obtained as in Example 1 except that in (2) of Example 1, the neutralization pH was 7.8 instead of 7.3.

Example 4

Metatitanic acid (sample d) and a lithium titanate granulated particle (sample D) were obtained as in Example 1 except that in (2) of Example 1, the drying temperature was 300° C. instead of 150° C.

Example 5

A lithium titanate granulated particle of the present invention (sample E) was obtained as in Example 1 except that in (3) of Example 1, the firing temperature was 740° C. instead of 700° C.

Example 6

The sample A obtained in Example 1 was ground in a fret mill (grinding roller 40 kg, the number of revolutions of the roller 50 rpm), and the ground material was crushed and classified by a mesh having an opening of 0.5 mm to obtain a lithium titanate powder of the present invention (sample F).

Example 7

The sample A obtained in Example 1 was ground in a hammer mill to obtain a lithium titanate powder of the present invention (sample G).

Example 8

The sample A obtained in Example 1 was ground in a jet mill to obtain a lithium titanate powder of the present invention (sample H).

Comparative Example 1

Titanium dioxide (sample i) and a lithium titanate granulated particle (sample I) were produced as in Example 1 except that in (2) of Example 1, the drying temperature was 550° C. instead of 150° C.

Comparative Example 2

Lithium titanate was produced by the following method using crystalline titanium dioxide and orthotitanic acid for the titanium raw material instead of metatitanic acid.

3 L of a 9.14 mol/L ammonia aqueous solution and 1.5 L of pure water were placed in a reaction container and heated with stirring so that the temperature of the solution reached 50 to 60° C. 4.5 L of a 1.25 mol/L titanium tetrachloride aqueous solution was added over 2 hours, and then the mixture was aged for 1 hour. The produced precipitate was filtered and washed with 2 L of pure water to obtain a titanic acid compound (orthotitanic acid). Then, the obtained orthotitanic acid was dispersed in pure water to obtain a 150 g/L slurry in terms of $TiO_2$.

Next, 371 g of crystalline titanium oxide (having the diffraction peaks of the anatase type and the rutile type) was added to 1.6 L of a 3.5 mol/L lithium hydroxide aqueous solution and dispersed. While this slurry was stirred, the liquid temperature was kept at 80° C., and 1.2 L of the above orthotitanic acid slurry (150 g/L) was added to obtain a mixed slurry comprising titanium dioxide, orthotitanic acid, and a lithium compound.

Next, the inlet temperature and outlet temperature of a spray dryer (L-8i model manufactured by Ohkawara Kakohki Co., Ltd.) were adjusted at 190° C. and 90° C., respectively, and the above mixed slurry was spray-dried. The obtained dry granulated material was fired in the air at a temperature of 700° C. for 3 hours to obtain a lithium titanate granulated particle (sample J).

Evaluation 1, Evaluation of Titanium Raw Materials

Table 1 shows the results of examining the BET specific surface area, and the $SO_4$ content and the ammonia content based on the amount of metatitanic acid in terms of $TiO_2$ for the samples a to d and i obtained in the Examples and the Comparative Examples. It was found that when the drying temperature of metatitanic acid was 500° C. or less, the BET specific surface area was moderate. In addition, it was found that when the neutralization pH was in the range of 6 to 9, the $SO_4$ content and the content of nitrogen derived from ammonia were both appropriate amounts.

TABLE 1

| | Sample | Neutralization pH | Drying temperature (° C.) | Specific surface area ($m^2/g$) | $SO_4$ (% by mass) | $NH_3$ (% by mass) |
|---|---|---|---|---|---|---|
| Example 1 | a | 7.3 | 150 | 335 | 0.6 | 0.01 |
| Example 2 | b | 6.9 | 150 | 339 | 1.1 | 0.06 |
| Example 3 | c | 7.8 | 150 | 326 | 0.5 | 0.21 |
| Example 4 | d | 7.3 | 300 | 145 | 0.6 | 0.01 |
| Comparative Example 1 | i | 7.3 | 550 | 86 | 0.6 | 0.02 |

Evaluation 2, Evaluation of Lithium Titanate Granulated Particles

The D10, D50,1, and D90 of the samples obtained in the Examples and the Comparative Examples were measured, and D50,2 was measured to obtain Zd and SD. They are shown in Table 2, In addition, the BET specific surface area, the nonreaction rate, the amount of oil absorption, the bulk density, and the tap density were measured, and the results are shown in Table 3. The samples of the Examples had a Zd of 2 or more and were easily ground. In addition, it was found that the specific surface area was also relatively large, the nonreaction rate was low, and the amount of oil absorption and the bulk density were also moderate.

The nonreaction rates of the obtained samples were measured as follows. The powder X-ray diffraction pattern was measured using a powder X-ray diffraction apparatus. As a result, it was confirmed that all samples comprised $Li_4Ti_5O_{12}$ as the main component. In addition, among the measured peak intensities, the peak intensity of $Li_4Ti_5O_{12}$ around $2\theta=18°$ was used as X, and the peak intensity of the rutile type $TiO_2$ around $2\theta=27°$, the peak intensity of the anatase type $TiO_2$ around $2\theta=25°$, and the peak intensity of $Li_2TiO_3$ around $2\theta=44°$ were used as Y to calculate the above-described single phase rate to determine nonreaction rate=100−single phase rate.

TABLE 2

| Sample | | Firing temperature (° C.) | D10 (μm) | D50.1 (μm) | D90 (μm) | D50.2 (μm) | Zd | SD (μm) |
|---|---|---|---|---|---|---|---|---|
| Example 1 | A | 700 | 1.8 | 5.1 | 9.9 | 0.9 | 5.7 | 4.1 |
| Example 4 | D | 700 | 4.6 | 7.9 | 13.0 | 0.9 | 8.8 | 4.2 |
| Example 5 | E | 740 | 3.8 | 6.8 | 11.2 | 0.8 | 8.5 | 3.7 |
| Comparative Example 1 | I | 700 | 4.7 | 8.0 | 12.9 | — | — | 4.1 |
| Comparative Example 2 | J | 700 | 3.4 | 6.6 | 10.8 | 5.6 | 1.2 | 3.7 |

TABLE 3

| Sample | | Specific surface area ($m^2/g$) | Nonreaction rate (%) | Amount of oil absorption (g/100 g) | Bulk density ($g/cm^3$) | Tap density ($g/cm^3$) |
|---|---|---|---|---|---|---|
| Example 1 | A | 8.1 | 0 | 38 | 0.45 | 0.65 |
| Example 4 | D | 6.4 | 0 | 38 | 0.49 | 0.73 |
| Example 5 | E | 6.5 | 0 | 38 | 0.45 | 0.72 |
| Comparative Example 1 | I | 5.7 | 2.3 | 37 | 0.56 | 0.84 |
| Comparative Example 2 | J | 9.6 | 0 | 42 | 0.37 | 0.76 |

Evaluation 3, Evaluation of Lithium Titanate Powders

Table 4 shows the results of D10, D50, D90, SD, the specific surface area, the nonreaction rate, the amount of oil absorption, and the peel strength for the ground samples obtained in the Examples. It was found that the samples of the Examples had good powder characteristics as an electrode active material and moreover had strong peel strength and were firmly fixed to current collectors.

The peel strength was evaluated in 6 grades from 0 to 5 using the Cross-cut test JIS K5600-5-6 (ISO2409). A grid of 25 squares is made in the following evaluation sample using a utility knife, and CELLOTAPE (registered trademark) is strongly pressure-bonded to the grid portion. An end of the tape is peeled at once at an angle of 60°, and then, the state of the grid is compared with a standard diagram and evaluated. As the numerical value of 0 to 5 becomes smaller, stronger peel strength is indicated. The evaluation sample was made by mixing each of the samples obtained in the Examples, an acetylene black powder as a conductive agent, and a polyvinylidene fluoride resin as a binding agent at a mass ratio of 100:5:8 and kneading the mixture to prepare a paste, applying this paste onto aluminum foil, and drying the paste at a temperature of 120° C. for 10 minutes followed by pressing at 17 MPa.

kneaded to prepare a paste. This paste was applied onto aluminum foil and dried at a temperature of 120° C. for 10 minutes, and then the aluminum foil was punched into a circle having a diameter of 12 mm and pressed at 17 MPa to provide a working electrode. The amount of the active material contained in the electrode was 3 mg.

This working electrode was vacuum-dried at a temperature of 120° C. for 4 hours, and then incorporated into a sealable coin type cell as a positive electrode in a glove box having a dew point of −70° C. or less. For the coin type cell, one whose material was made of stainless steel (SUS316) and Which had an outer diameter of 20 mm and a height of 3.2 mm was used. For the negative electrode, metal lithium having a thickness of 0.5 mm molded into a circle having a diameter of 12 mm was used. As the nonaqueous electrolytic solution, a mixed solution of ethylene carbonate and dimethyl carbonate (mixed at a volume ratio of 1:2) in which LiPF6 was dissolved at a concentration of 1 mol/L was used.

The working electrode was placed in the lower can of the coin type cell, and a porous polypropylene film was placed on the working electrode as a separator. The nonaqueous electrolytic solution was dropped from above the porous polypropylene film. The negative electrode and a 0.5 mm

TABLE 4

| Sample | | D10 (μm) | D50 (μm) | D90 (μm) | SD (μm) | Specific surface area ($m^2/g$) | Nonreaction rate (%) | Amount of oil absorption (g/100 g) | Peel strength |
|---|---|---|---|---|---|---|---|---|---|
| Example 6 | F | 0.44 | 0.79 | 1.8 | 0.7 | 8.1 | 0 | 27 | 2 |
| Example 7 | G | 0.49 | 1.2 | 3.9 | 1.7 | 8.2 | 0 | 28 | 2 |
| Example 8 | H | 0.40 | 0.79 | 2.7 | 1.2 | 8.3 | 0 | 26 | 2 |

Evaluation 4, Making of Electric Storage Devices

Each of the samples obtained in the Examples and the Comparative Examples, an acetylene black powder as a conductive agent, and a polyvinylidene fluoride resin as a binding agent were mixed at a mass ratio of 100:5:7 and thick spacer and a spring (both were made of SUS316) for thickness adjustment were further placed thereon. An upper can with a gasket made of polypropylene was overlaid, and the outer peripheral edge portion was crimped and sealed to obtain an electric storage device.

(1) Evaluation of Rate Capability

For the electric storage devices made as above, the discharge capacity was measured with various amounts of current, and the capacity retention rate (%) was calculated. The measurement was performed with the discharge current set in the range of 1 C to 30 C. The environment temperature was 25° C. The capacity retention rate was calculated by the formula of $(X_{10}/X_1) \times 100$ wherein the measured value of discharge capacity at 1 C was $X_1$, and the measured value at 10 C was $X_{10}$. Here, 1 C means a current value at which full charge can be performed in 1 hour, and in this evaluation, 0.48 mA corresponds to 1 C. The results are shown in Table 5. It was found that the electric storage devices using the samples of the Examples had a high capacity retention rate and good rate capability.

(2) Evaluation of Low Temperature Property

For the electric storage devices made as above, charge and discharge similar to the above was performed in a low temperature environment (−40° C.) in the voltage range of 1 to 3 V and the current range of 0.25 C to 1.0 C. The ratio of the discharge capacity $X_n$ at the low temperature environment and at 25° C. $(X_{0.25}(-40°\,C.)/X_{0.25}(25°\,C.) \times 100)$ is defined as a low-temperature property. When this value is large, the low temperature property is excellent. The results are shown in Table 5. It was found that the electric storage devices using the samples of the Examples had good low temperature property.

TABLE 5

| | Sample | Rate capability 10 C/1 C (%) | Low temperature property $X_{0.25}$ (−40° C.)/$X_{0.25}$ (25° C.) (%) |
|---|---|---|---|
| Example 1 | A | 95 | 49 |
| Example 7 | G | 95 | 47 |
| Comparative Example 1 | I | 80 | 38 |
| Comparative Example 2 | J | 92 | 47 |

INDUSTRIAL APPLICABILITY

The lithium titanate of the present invention is easily pulverized and easily dispersed in a binding agent. When it is used as an electrode active material, an electric storage device having excellent battery characteristics can be made.

In addition, the method for producing lithium titanate according to the present invention can reliably and stably produce lithium titanate at low cost even at a firing temperature lower than that of conventional production methods.

The invention claimed is:

1. A lithium titanate granulated particle, comprising particles having a degree of grinding Zd, represented by the following Formula 1 is 2 or more, $$Zd = D50,1/D50,2 \quad \text{(Formula 1)}$$

wherein D50,1 is a cumulative 50% particle diameter (μm) of lithium titanate before grinding, and D50,2 is a cumulative 50% particle diameter (μm) of the lithium titanate after grinding, resulting in the granulated particle having a physical characteristic such that 1 g of a sample is placed within a circle having an area of 2 cm² and pressed with a load at a pressure of 35 MPa applied to the sample for 1 minute, and the lithium titanate granulated particle has a particle size distribution represented by a SD value being 2.0 to 8.0 μm, wherein the SD value is represented by the following Formula 2, $$SD(\mu m) = (D90 - D10)/2 \quad \text{Formula 2}$$

wherein D10 is a cumulative 10% particle diameter of lithium titanate granulated particle, and D90 is a cumulative 90% particle diameter of lithium titanate granulated particle, and the chemical formula is $Li_xTi_yO_4$, wherein $0.8 < x < 1.4$ and $1.6 < y < 2.2$.

2. The lithium titanate granulated particle according to claim 1, having a cumulative 50% particle diameter (D50,1) of 0.5 to 50 μm and a 330 mesh sieve residue of 0.1% by mass or less.

3. The lithium titanate granulated particle according to claim 2, having a BET specific surface area of 5 to 50 m²/g.

4. A lithium titanate granulated particle, comprising particles having a degree of grinding Zd, represented by the following Formula 1, is 2 or more, $$Zd = D50,1/D50,2 \quad \text{(Formula 1)}$$

wherein D50,1 is a cumulative 50% particle diameter (μm) of lithium titanate before grinding, and D50,2 is a cumulative 50% particle diameter (μm) of the lithium titanate after grinding, and the lithium titanate granulated particle having a particle size distribution represented by a SD value being 2.0 to 8.0 μm, wherein the SD value is represented by the following Formula 2, $$SD(\mu m) = (D90 - D10)/2, \quad \text{Formula 2}$$

wherein D10 is a cumulative 10% particle diameter of lithium titanate granulated particle, and D90 is a cumulative 90% particle diameter of lithium titanate granulated particle, and the chemical formula is $Li_xTi_yO_4$, wherein $0.8 < x < 1.4$ and $1.6 < y < 2.2$.

5. The lithium titanate granulated particle according to claim 1, having a BET specific surface area of 5 to 50 m²/g.

6. A method for producing lithium titanate granulated particle according to claim 4, comprising the steps of:
(1) thermally hydrolyzing titanyl sulfate or titanium sulfate to produce metatitanic acid;
(2) preparing a slurry comprising the metatitanic acid, neutralizing the slurry to pH 6.0 to 9.0, and then subjecting the slurry to solid-liquid separation to produce a titanium raw material comprising metatitanic acid having a BET specific surface area of 100 to 400 m²/g and a content of a sulfuric acid component ($SO_4$) of 0.01 to 2.0% by mass based on an amount of the metatitanic acid in terms of $TiO_2$; and
(3) mixing the titanium raw material and a lithium compound and then firing an obtained mixture to produce the lithium titanate granulated particle.

7. The method for producing lithium titanate granulated particle according to claim 6, wherein in the step of (2), after the metatitanic acid is subjected to solid-liquid separation, the metatitanic acid is dried and dry-ground to produce the titanium raw material comprising the metatitanic acid.

8. The method for producing lithium titanate granulated particle according to claim 6, wherein the step of (3) is a step of preparing a mixed slurry of the metatitanic acid-containing titanium raw material and a lithium compound and then firing the mixed slurry.

9. The method for producing lithium titanate granulated particle according to claim 6, wherein the step of (3) is a step of preparing a mixed slurry of the metatitanic acid-containing titanium raw material and a lithium compound, then wet-grinding the mixed slurry, and then firing the mixed slurry.

10. The method for producing lithium titanate granulated particle according to claim 9, wherein in the step of (3), wet-grinding is performed so that a cumulative 50% particle diameter of the titanium raw material is in a range of 0.5 to 3.0 μm.

11. The method for producing lithium titanate granulated particle according to claim 8, wherein in the step of (3), the mixed slurry is dried and granulated before firing.

12. The method for producing lithium titanate granulated particle according to claim 6, wherein in the step of (3), firing is performed at a temperature of 600 to 950° C.

13. The method for producing lithium titanate granulated particle according to claim 6, further comprising a step of (4) further dry-grinding lithium titanate.

14. An electric storage device electrode obtained by mixing at least the lithium titanate granulated particle or the lithium titanate powder according to claim 1 and a binding agent and fixing an obtained mixture to a current collector.

15. An electric storage device comprising at least the electrode according to claim 14, a counter electrode to the electrode, and an electrolyte.

16. A method for producing an electric storage device electrode, comprising a step of mixing at least lithium titanate produced by the method according to claim 6 with a binding agent and fixing an obtained mixture to a current collector.

17. An electric storage device comprising at least an electrode produced by the method according to claim 16, a counter electrode to the electrode, and an electrolyte.

* * * * *